(12) United States Patent
MacGuinness

(10) Patent No.: US 10,492,469 B2
(45) Date of Patent: Dec. 3, 2019

(54) CLOSURE SYSTEM FOR THE FRONT END OF A HORSE RUG

(71) Applicant: HORSEWARE PRODUCTS LTD, Dundalk, County Louth (IE)

(72) Inventor: Thomas Joseph MacGuinness, Dromiskin (IE)

(73) Assignee: HORSEWARE PRODUCTS LTD, Dundalk, Co. Louth (IE)

( * ) Notice: Subject to any disclaimer, the term of this patent is extended or adjusted under 35 U.S.C. 154(b) by 113 days.

(21) Appl. No.: 15/573,906

(22) PCT Filed: Mar. 9, 2016

(86) PCT No.: PCT/EP2016/055034
§ 371 (c)(1),
(2) Date: Nov. 14, 2017

(87) PCT Pub. No.: WO2016/184586
PCT Pub. Date: Nov. 24, 2016

(65) Prior Publication Data
US 2018/0343832 A1    Dec. 6, 2018

(30) Foreign Application Priority Data

May 15, 2015  (GB) .................................. 1508391.8

(51) Int. Cl.
*A01K 13/00*     (2006.01)
*A44B 18/00*     (2006.01)

(52) U.S. Cl.
CPC ........ *A01K 13/008* (2013.01); *A44B 18/0069* (2013.01)

(58) Field of Classification Search
CPC ............. Y10T 24/4023; Y10T 24/4014; Y10T 24/4088; Y10T 24/4021; A44B 11/04; A44B 18/0069; A01K 13/008; A45F 5/022
(Continued)

(56) References Cited

U.S. PATENT DOCUMENTS 5,125,220 A    6/1992  Martin
6,085,694 A    7/2000  Simon
(Continued)

FOREIGN PATENT DOCUMENTS

EP           0 930 819 B1    6/2004

OTHER PUBLICATIONS

International Preliminary Report on Patentability for PCT/EP2016/055034 (PCT/IPEA/409) completed on Aug. 1, 2017.
(Continued)

*Primary Examiner* — Robert Sandy
(74) *Attorney, Agent, or Firm* — Birch, Stewart, Kolasch & Birch, LLP

(57) ABSTRACT

A closure system (10) for the front end (11) of a horse rug (12) which holds together the sides (13, 14) of the horse rug (12) over the chest of a horse (indicated by reference numeral 15). The closure system (10) consists of a pair of opposed straps (16, 17), each strap (16, 17) being fixed to a respective side (13, 14) of the rug (12) at the front end (11) thereof, and a connector (18) to which each strap (16, 17) is attachable, the connector (18) being of a shape such that, in use, when the sides (13, 14) of the front end (11) of the rug (12) are brought together and the straps (16, 17) are attached to the connector (18), the connector (18) sits snugly against the horse's chest (at 15), which minimises the possibility of the closure becoming snagged by any obstacles.

14 Claims, 5 Drawing Sheets

(58) Field of Classification Search
USPC .......................................................... 54/79.2
See application file for complete search history.

(56) References Cited

U.S. PATENT DOCUMENTS

| | | | |
|---|---|---|---|
| 6,237,310 B1 * | 5/2001 | MacGuinness | A01K 13/008 54/79.2 |
| 2012/0017550 A1 | 1/2012 | Cammas | |

OTHER PUBLICATIONS

International Search Report for PCT/EP2016/055034 (PCT/ISA/210) dated Jun. 3, 2016.
Written Opinion of the International Searching Authority for PCT/EP2016/055034 (PCT/ISA/237) dated Jun. 3, 2016.

* cited by examiner

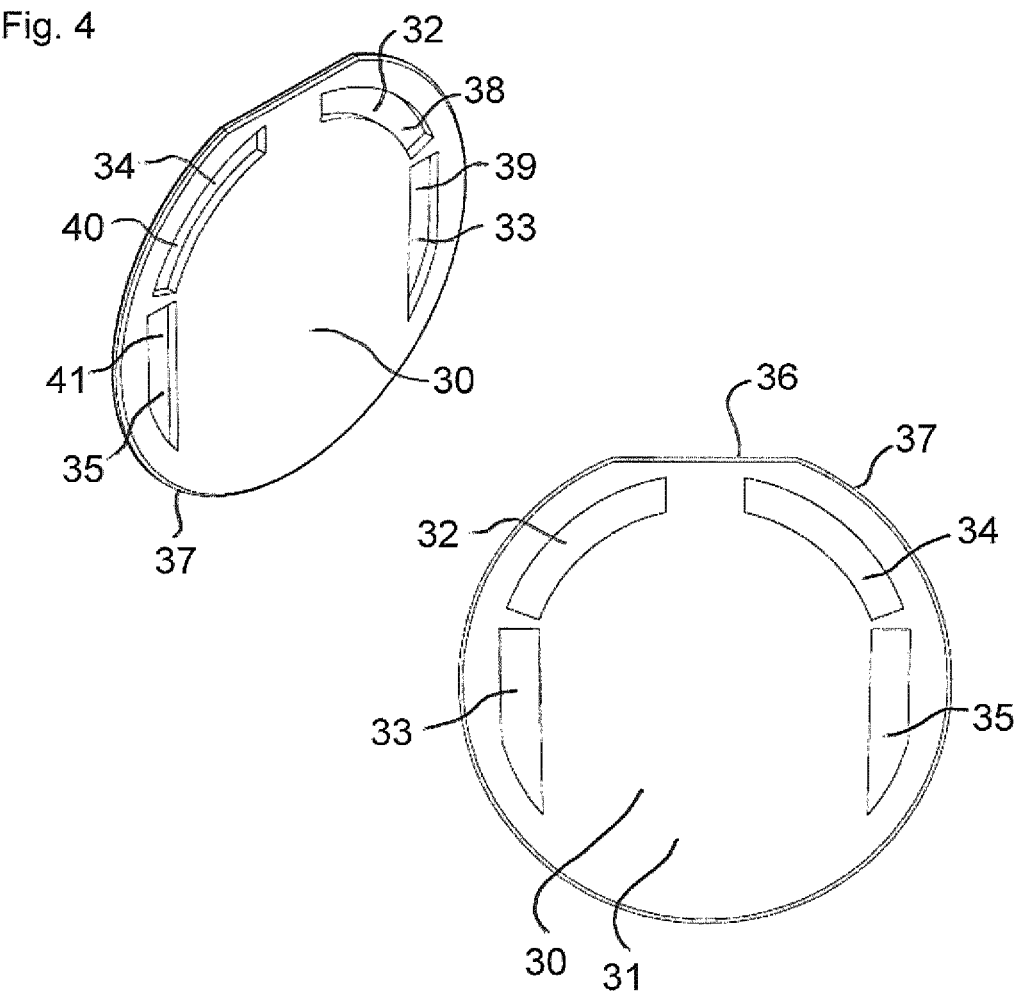

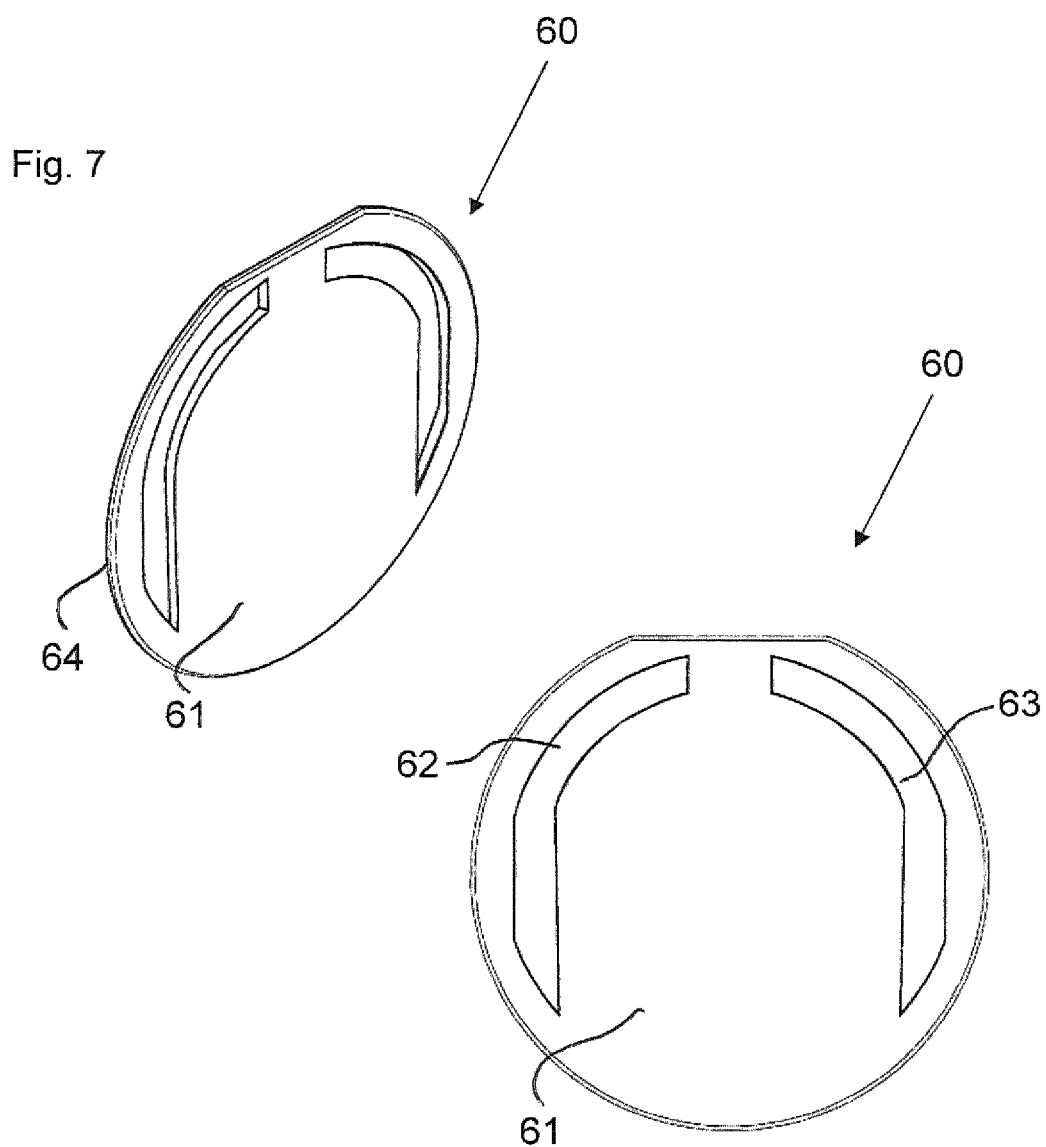

CLOSURE SYSTEM FOR THE FRONT END OF A HORSE RUG

This invention relates to a closure system for the front end of a horse rug and, in particular, to a closure system for holding together the sides of the horse rug over the chest of the horse.

The conventional horse rug when applied to a horse is constructed so that the rug engages at or rearwardly of the withers. A number of closure systems for the front end of a horse rug are known.

The Amigo® Bravo turnout, marketed by Horseware Ireland®, Finnabair Business Park, Dundalk, County Louth, Ireland, is currently available in Europe and the U.S.A. The Amigo® Bravo turnout consists of a horse rug with buckles and straps at the front end thereof which are used to secure the sides of the horse rug over the chest of the horse.

EP 0 930 819 B1 discloses a horse rug which maintains its position on a horse once it is placed on the horse while the horse undergoes its normal movements. The document describes a horse rug with strips of webbing along the front edge thereof, which can be engaged using a hook and ring assembly in order to create a collar effect about the neck of the horse.

However, the front closure means of the horse rugs as previously described sit loosely against the horse's chest, in use. It has been found that such closure means occasionally get snagged by obstacles in the environment, which may cause distress to the horse, or lead to damage being caused to the rug as the horse pulls away from the obstacle. Also, the aforementioned hook and ring assembly and the buckle and straps assembly include metallic parts, which have been found to rust and to accumulate dirt, thus compromising the integrity of the closure means.

Furthermore, the hook and ring assembly of the front closure of EP 0 930 819 B1 has an uneven weight distribution, which, in use, adds more weight to one side of the rug than the other.

It is an object of the present invention to overcome the disadvantages of the closure systems hereinbefore described.

Thus, the invention provides a closure system for the front end of a horse rug, for holding together the sides of the horse rug over the chest of a horse, which system comprises a pair of opposed straps, and each strap being fixed to a respective side of the rug at the front end thereof, and a connector to which the and each strap is attachable, the connector being of a shape such that, in use, when the front ends of the sides of the rug are brought together and the straps are attached to the connector, the connector sits snugly against the horse's chest.

An advantage of the closure system according to the invention is that, in use, the closure system is of a snug fit against the horse, which minimises the possibility of the closure becoming snagged by any obstacles.

Preferably, the connector is a plate having a plurality of orifices located near the periphery thereof, the orifices being spaced apart, such that, in use, an orifice is alignable with a respective strap of the pair of opposed straps, with the and each strap being passable through the respective orifice, and thereby attached to the plate, and the and each orifice being dimensioned such that the corresponding strap is a snug fit therein.

An advantage of this aspect of the closure system is that, in use, the system is substantially tight-fitting, providing minimum space available for dirt or other obstacles to become lodged therein.

A further advantage of the closure system is that, in use, there are minimal areas across the closure system that could be snagged by an obstacle.

A still further advantage of the closure system is that, in use, it is symmetrical, with an even weight distribution across the closure system.

In one embodiment of the closure system, the plate is generally circular with the upper edge of the plate, between the orifices, being flattened.

An advantage of this aspect of the closure system is that, in use, the connector sits substantially flat against the chest of the horse, thus it is more comfortable for the horse when it lowers its head and neck when the horse is feeding, for example.

In a further embodiment of the closure system, an additional pair of straps is fixed to the respective sides of the rug at the front end thereof, with the additional pair of straps being passable through corresponding orifices in the periphery of the plate.

An advantage of this aspect of the closure system is that, in use, the horse rug will remain closed in the event that one of the straps breaks.

In a further embodiment of the closure system, the and each strap has a tab attached to the end thereof, which end faces the plate, in use, the and each tab being passable through the respective orifice and the and each tab being foldable back to connect to the respective strap.

An advantage of this aspect of the closure system is that the closure system can be engaged quickly and simply.

Preferably, the tabs connect to the straps by means of a system of hooks and loops.

An advantage of this aspect of the closure system is that the system of hooks and loops is not overly affected by the elements, thus the closure system is not compromised by wet or dirt.

An example of such a system of hooks and loops is that marketed under the VELCRO® trade mark.

In a further embodiment of the closure system, each orifice is in the form of a slot.

An advantage of this aspect of the closure system is that the connector will attach to the straps in the same orientation each time the rug is closed.

In a further embodiment of the closure system, the orifices to each side of the plate are in the form of a single slot.

An advantage of this aspect of the closure system is that the device can be readily engaged, thus reducing the setup time required to fit the rug to the horse.

In a further embodiment of the closure system, the additional pair of straps, in use, follows the groove between the neck and the shoulder of the horse.

An advantage of this aspect of the closure system is that, in use, the rug is maintained in a position relative to the point of shoulder while the horse undergoes its normal movements.

In a further embodiment of the closure system, the straps to each side of the rug define an angle of 40° to 70° therebetween.

An advantage of this aspect of the closure system is that, in use, the system creates a collar effect for the rug around the neck of the horse, thus allowing the rug to move more naturally concomitant with the movements of the horse.

Preferably, the straps to each side of the rug define an angle of 60° therebetween.

An advantage of this aspect of the closure system is that the incidence of rubbing and interference with the natural movement of the horse is significantly reduced.

In a further embodiment of the closure system, the connector is made of a material with a pre-determined breaking strength.

An advantage of this aspect of the closure system is that in the unlikely event of the closure system becoming snagged by an obstacle, the fact that the connector is frangible allows the horse to break free of the obstacle without distress or without causing further damage to the horse rug.

In a further embodiment of the closure system, additional means is provided for securing the rug across the chest of the horse, in use.

An advantage of this aspect of the closure system is that the rug will remain on the horse even in the event of the closure system failing.

Preferably, the connector sits atop the additional means for securing the rug across the chest of the horse, in use.

An advantage of this aspect of the closure system is that the connector acts as a barrier protecting the additional closure means from dirt or any other obstacles which may compromise the closure.

The invention will be further illustrated by the following description of embodiments thereof, given by way of example only with reference to the accompanying drawings in which:

FIG. 3 is a front elevation view of a further embodiment of a connector for a closure system in accordance with the invention;

FIG. 4 is a rear view of the connector of FIG. 3;

FIG. 6 is the front elevation view of a further embodiment of a connector for a closure system in accordance with the invention; and FIG. 7 is the rear view of the connector of FIG. 6.

Figure 1:
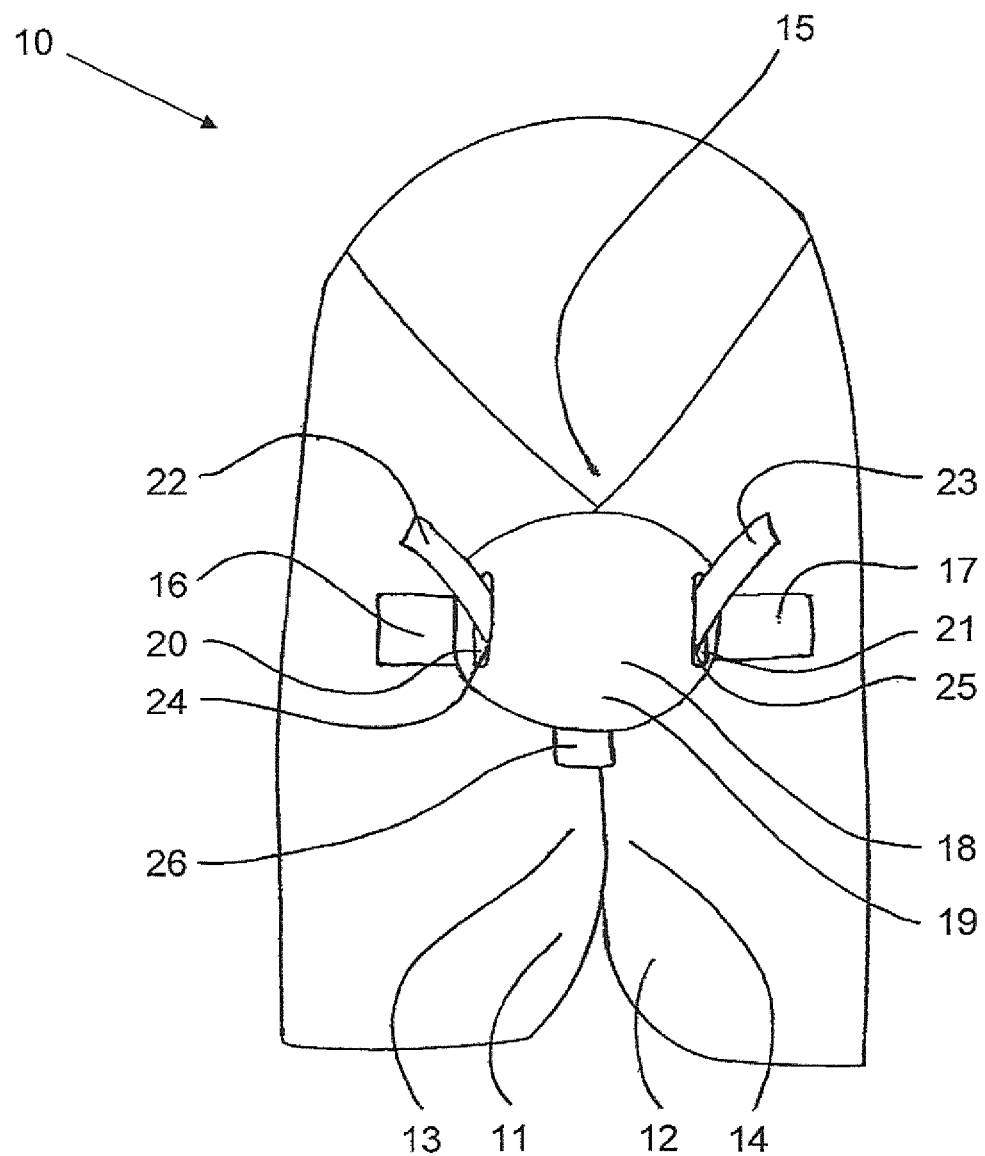
FIG. 1 is a schematic representation of a closure system in accordance with the invention positioned on a horse (not shown) wherein the straps are in a partially closed position.

Referring to FIG. 1, there is illustrated generally at 10, a closure system for the front end 11 of a horse rug 12 for holding together the sides 13, 14 of the horse rug 12 over the chest of a horse in use, indicated by reference numeral 15, in accordance with the invention. The closure system 10 consists of a pair of opposed straps 16, 17, each strap 16, 17 being fixed to a respective side 13, 14 of the rug 12 at the front end 11 thereof, and a connector 18 to which each strap 16, 17 is attachable, the connector 18 being of a shape such that, in use, when the sides 13, 14 of the front end 11 of the rug 12 are brought together and the straps 16, 17 are attached to the connector 18, the connector 18 sits snugly against the horse's chest at 15.

The connector 18 comprises a plate 19 having a plurality of orifices 20, 21 located near the periphery thereof, the orifices 20, 21 being spaced apart, such that, in use, an orifice 20, 21 is alignable with a respective strap 16, 17, with each strap 16, 17 being passable through the respective orifice 20, 21, and thereby attached to the plate 19.

Each strap 16, 17 has a tab 22, 23 attached to the respective end 24, 25 thereof, which end 24, 25 faces the plate 19, in use, each tab 22, 23 being passable through the respective orifice 20, 21 and each tab 22, 23 being foldable back to connect to the respective strap 16, 17.

Additional means 26 in the form of a closure using a system of hooks and loops is provided beneath the connector 18 for securing the rug 12 across the chest of the horse at 15, in use.

Figure 2:
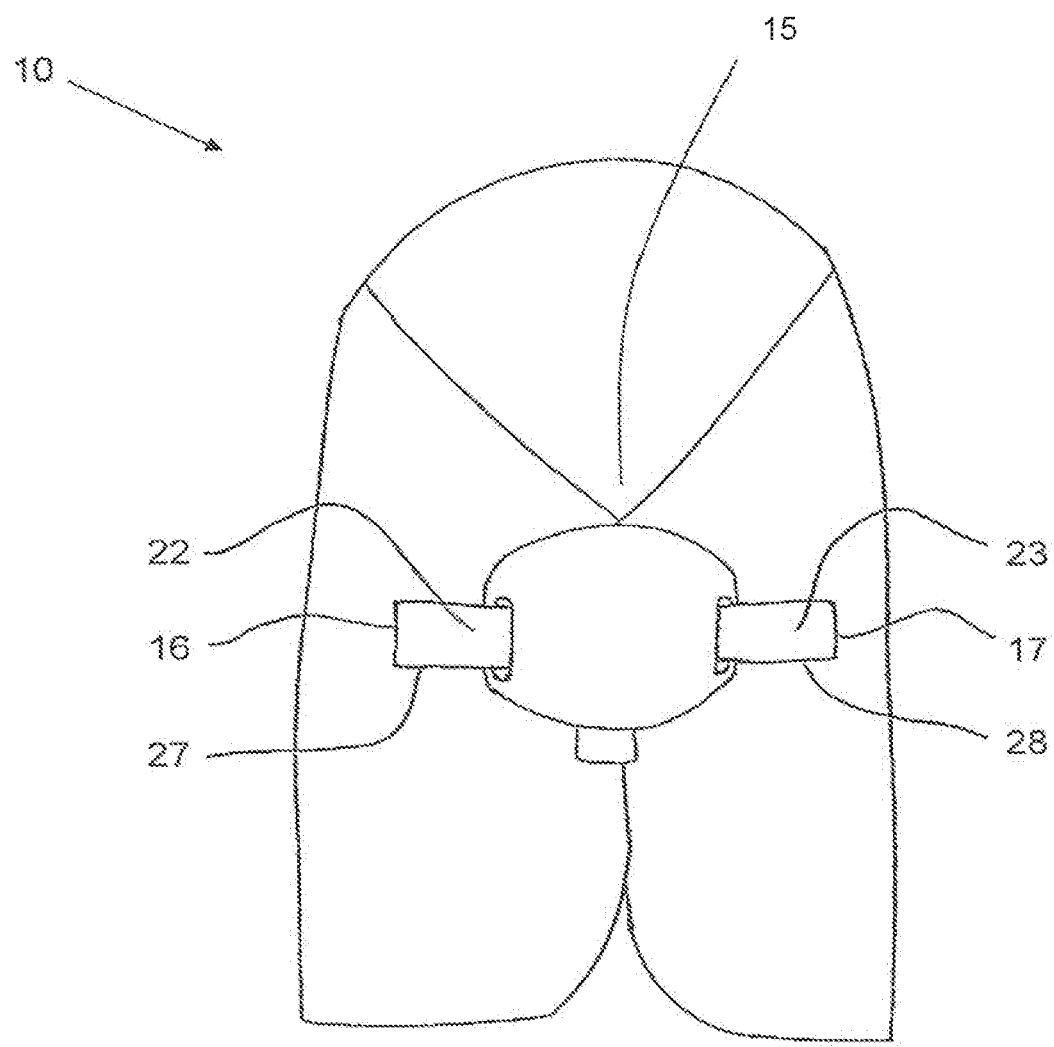
FIG. 2 is a schematic representation of the closure system of FIG. 1 wherein the straps are in a fully closed position.

Referring to FIG. 2, the closure system 10 is shown wherein the straps 16, 17 are in a fully closed position.

The tabs 22, 23 connect to the straps 16, 17 by a system of hooks and loops 27, 28.

Referring to FIG. 3, a further embodiment of a connector for a closure system in accordance with the invention is illustrated.

The connector 30 is a generally circular plate 31. Four orifices 32, 33, 34, 35 in the plate 31 are adapted to receive a strap (not shown) of the closure system (not shown), with upper edge 36 of edge 37 of plate 31, between the orifices 32 and 34, being flattened.

Referring to FIG. 4, a rear view of the connector of FIG. 3 is illustrated.

Each orifice 32, 33, 34, 35 is in the form of a respective slot 38, 39 40, 41. The edge 37 is bevelled.

Figure 5:
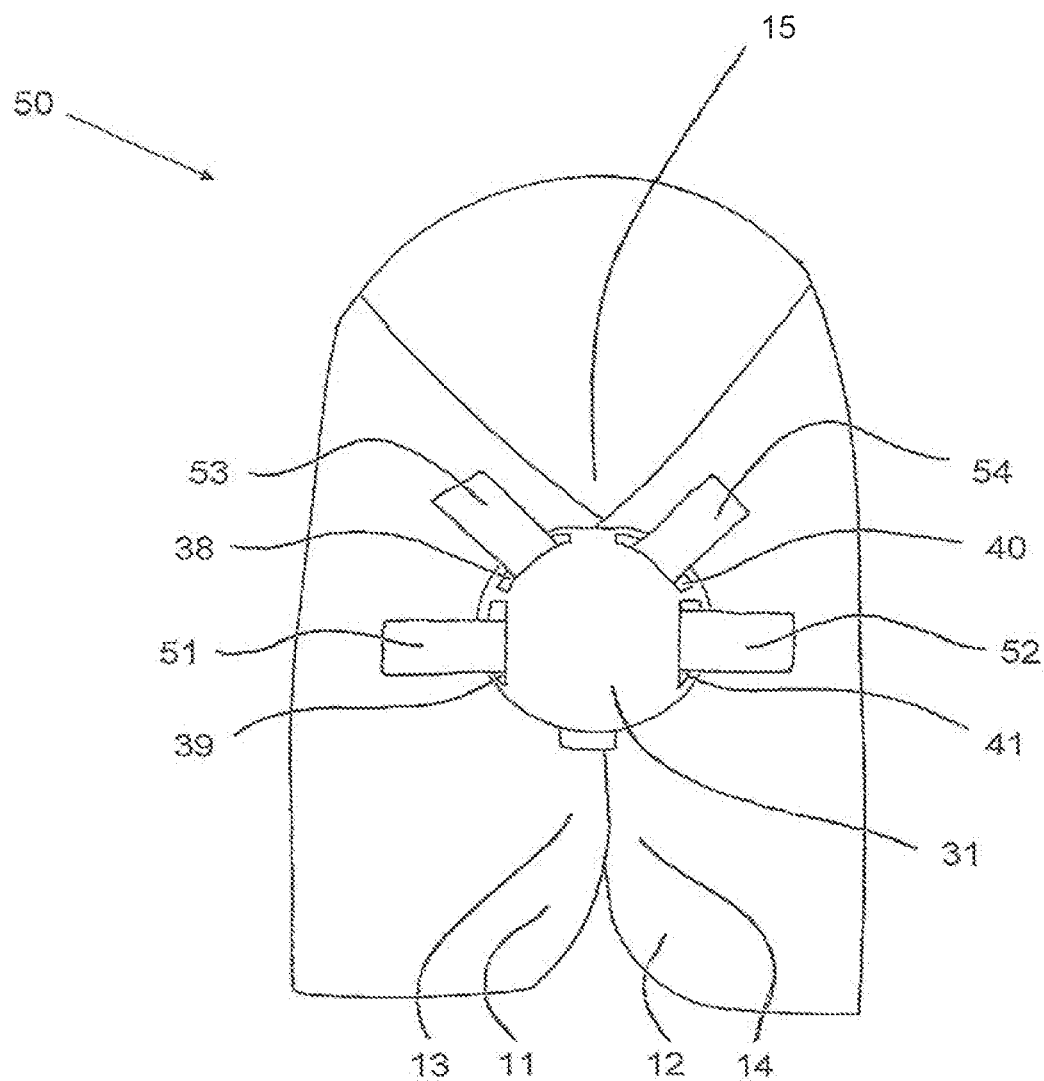
FIG. 5 is a schematic representation of a further embodiment of a closure system in accordance with the invention in a closed position and incorporating the connector of FIGS. 3 and 4.

Referring to FIG. 5, a further embodiment of a closure system in accordance with the invention is illustrated generally at 50 in a closed position and incorporating the connector of FIGS. 3 and 4.

A pair of straps 51, 52 is fixed to the respective sides 13, 14 of the rug 12 at the front end 11 thereof, and pass through respective slots 39, 41 in plate 31. An additional pair of straps 53, 54 is passable through corresponding slots 38, 40.

The additional pair of straps 53, 54, in use, follows the groove between the neck and the shoulder of the horse (both not shown).

The straps 51, 52 and 53, 54 to each side 13, 14 of the rug 12 define an angle of 60° therebetween.

Referring to FIG. 6, a front elevation view is shown of a further embodiment of a connector, illustrated generally at 60, for as closure system in accordance with the invention.

The connector 60 is in the form of a plate 61 having a curved slot 62, 63 to each side thereof.

Referring to FIG. 7, the rear of connector 60 is shown. Edge 64 of plate 61 is bevelled.

Each slot 62, 63 can accommodate two strips of a closure system in accordance with the invention.

The invention claimed is:

1. A closure system for a front end of a horse rug, for holding together the sides of the horse rug over the chest of a horse, which system comprises a pair of opposed straps and an additional pair of straps, each strap being fixed to a respective side of the rug at the front end thereof, and a connector to which each strap is attachable, the connector being a plate having a plurality of orifices located near a periphery thereof, the orifices being spaced apart such that, in use, an orifice is alignable with a respective strap of the additional pair of straps, with each strap being passable through the respective orifice and thereby attached to the plate, and each orifice being dimensioned such that the corresponding strap is a snug fit therein, and the plate being of a shape such that, in use, when the front ends of the sides of the rug are brought together and the straps are attached to the plate, the plate sits snugly against the front ends of the sides of the rug over the horse's chest.

2. A system according to claim 1, wherein the plate is generally circular with an upper edge of the plate, between the orifices, being flattened.

3. A system according to claim 1, wherein each strap has a tab attached to an end thereof, which end faces the plate, in use, each tab being passable through the respective orifice and each tab being foldable back to connect to the respective strap.

4. A system according to claim 3, wherein the tabs connect to the straps by means of a system of hooks and loops.

5. A system according to claim 1, wherein each orifice is in the form of a slot.

6. A system according to claim 1, wherein the orifices to each side of the plate are in the form of a single slot.

7. A system according to claim 1, wherein the additional pair of straps, in use, follows the groove between the neck and the shoulder of the horse.

8. A system according to claim 7, wherein the straps to each side of the rug define an angle of 40° to 70° therebetween.

9. A system according to claim 7, wherein the straps to each side of the rug define an angle of 60° therebetween.

10. A system according to claim 1, wherein the connector is made of a material with a pre-determined breaking strength.

11. A system according to claim 1, wherein additional means is provided for securing the rug across the chest of the horse, in use.

12. A system according to claim 11, wherein the connector sits atop the additional means for securing the rug across the chest of the horse, in use.

13. A closure system for a front end of a horse rug, for holding together the sides of the horse rug over the chest of a horse, which system comprises a pair of opposed straps, each strap being fixed to a respective side of the rug at the front end thereof, and a connector to which each strap is attachable, the connector being of a shape such that, in use, when the front ends of the sides of the rug are brought together and the straps are attached to the connector, the connector sits snugly against the front ends of the sides of the rug over the horse's chest, and an additional pair of straps is fixed to the respective sides of the rug at the front end thereof, with the additional pair of straps being passable through corresponding orifices in a periphery of a plate, wherein the additional pair of straps, in use, follows a groove between the neck and the shoulder of the horse, wherein each strap has a tab attached to an end thereof, which end faces the plate, in use, each tab being passable through the respective orifice and the and each tab being foldable back to connect to the respective strap, wherein the tabs connect to the straps by means of a system of hooks and loops and each orifice is in the form of a slot, such that the orifices to each side of the plate are in the form of a single slot, and wherein the straps to each side of the rug define an angle of 60° therebetween.

14. A system according to claim 13, wherein additional means, in the form of a closure using a system of hooks and loops, is provided beneath the connector for securing the rug across the chest of the horse, in use.

\* \* \* \* \*